April 24, 1962  A. R. CRAWFORD ET AL  3,030,813
ENGINE ANALYZER
Filed March 20, 1956  6 Sheets-Sheet 1

INVENTORS
ARTHUR R. CRAWFORD
WALLACE R. RUSHIN
RICHARD E. PORTER
PAUL A. RYAN
BY
J. Stanley Churchill ATTORNEY

INVENTORS
ARTHUR R. CRAWFORD
WALLACE R. RUSHIN
RICHARD E. PORTER
PAUL A. RYAN
BY J. Stanley Churchill ATTORNEY

INVENTORS
ARTHUR R. CRAWFORD
WALLACE R. RUSHIN
RICHARD C. PORTER
PAUL A. RYAN
BY
J. Stanley Churchill ATTORNEY

April 24, 1962    A. R. CRAWFORD ET AL    3,030,813
ENGINE ANALYZER
Filed March 20, 1956    6 Sheets-Sheet 5

INVENTORS
ARTHUR R. CRAWFORD
WALLACE R. RUSHIN
RICHARD E. PORTER
PAUL A. RYAN
BY J. Stanley Churchill
ATTORNEY

INVENTORS
ARTHUR R. CRAWFORD
WALLACE R. RUSHIN
RICHARD E. PORTER
PAUL A. RYAN
BY
J. Stanley Churchill ATTORNEY United States Patent Office 3,030,813
Patented Apr. 24, 1962

3,030,813
ENGINE ANALYZER
Arthur R. Crawford, Worthington, and Walter R. Rushin, Richard E. Porter, and Paul A. Ryan, Columbus, Ohio, assignors to International Research & Development Corp., Columbus, Ohio, a corporation of Ohio
Filed Mar. 20, 1956, Ser. No. 572,691
20 Claims. (Cl. 73—466)

This invention relates to engine analyzer and balancing machines and is a continuation-in-part of assignee's copending application Serial No. 521,744, filed July 13, 1955, for Engine Analyzer and Balancer.

In the aforementioned copending application there is disclosed an apparatus for production balancing mass produced engines rapidly at a relatively low cost. That device includes, among other things, a first stroboscopic lamp fired in synchronism with the vibration at crank shaft frequency and a second stroboscopic lamp fired at a fixed frequency equal to the desired engine speed during the balancing operation. According to one method of utilizing that equipment the locus of unbalance is determined by the operator manually running the engine up to the proper speed as determined by the second stroboscopic lamp and then noting the position of a marker as determined by the first stroboscopic lamp. A single marker is generally utilized in connection with both lamps and a means is provided for maintaining the first lamp in an off condition until the engine is at approximately the desired speed. As the desired speed is approached, both lamps are firing, the first lamp illuminating a mark which is apparently stationary when the engine speed is stable and the second lamp illuminating a mark which is apparently moving except at the predetermined speed at which it is desired to test the engine. Since, as a practical matter, engine speed is almost never stable for any length of time, both marks are constantly moving and considerable skill is required to accurately determine the locus of unbalance. This is true despite the fact that according to one embodiment of that invention a governing means is provided for holding the engine speed at a predetermined value within plus or minus approximately one to two r.p.m.

According to the present invention this problem is solved by means of either of two somewhat similar procedures and equipment. According to the first procedure the stroboscopic lamp formerly actuated by a timer to fire at the desired engine speed is eliminated and is replaced by either a meter for indicating engine speed or by means of signal lights which inform the operator when the engine is approximately at the desired speed. In place of the single stroboscopic lamp firing in synchronism with the vibration at crank shaft frequency, a pair of such lamps is utilized, but these are so connected that they fire together only when the engine is exactly at the desired speed. Under the illumination of these lamps a single marker on the engine appears as two stationary markers at any fixed engine speed other than the desired speed. At the desired speed the lamps fire in synchronism with one another and the two marks merge to appear as one. The operator thus need only note when the two marks are superimposed to form a single mark and may then accurately note the locus of unbalance.

According to the second embodiment of this invention the engine is brought to approximately the proper speed by means of a stroboscopic lamp actuated by a timer or by means of an amplitude meter or signal lamps. Balancing is then accomplished through the use of but a single stroboscopic lamp which fires only when the engine is at the desired speed.

According to still another embodiment of the invention we have found that it is possible to indicate the locus of unbalance by means of a meter without the use of any stroboscopic light and have also found that this meter may be made to hold its reading after the test so that the operator may go through the steps of bringing the engine to speed and stopping it without noting the meter reading until the engine operation is complete. We have further found that the amplitude meter may be similarly controlled so that the operator need not note any readings or positions during operation of the engine but may refer to stationary meter readings at the termination of engine operation in order to balance the engine.

It is accordingly a primary object of the present invention to provide an engine analyzing and balancing machine for accurately and quickly balancing engines at low cost.

It is another object of the invention to provide an engine analyzing and balancing machine utilizing a stroboscopic lamp wherein the locus of unbalance may be determined with a minimum of skill on the part of the operator.

It is another object of the invention to provide an engine analyzer and balancing machine capable of consistently indicating the locus of unbalance when the engine for all practical purposes is exactly at a predetermined speed.

It is another object of the invention to provide an improved engine analyzer and balancer utilizing a pair of stroboscopic lamps which both fire in synchronism with the vibration at crank shaft frequency.

It is another object of the invention to provide an improved engine analyzer and balancer utilizing a single stroboscopic lamp which fires only when the engine is running at a predetermined speed.

It is another object of the invention to provide an improved engine analyzer and balancer capable of indicating locus of unbalance without the use of stroboscopic lamps.

It is another object of the invention to provide an improved engine analyzer and balancer of the foregoing type wherein the meter readings of amount and locus of unbalance are held until after the test is completed and until the operator has deliberately released such readings.

These and other objects and advantages of the invention will become apparent upon reference to the following specification and claims and appended drawings wherein:

FIGURE 15 is a circuit diagram of still a further embodiment of the invention wherein stroboscopic lights for indicating locus of unbalance are dispensed with;

Figure 1:
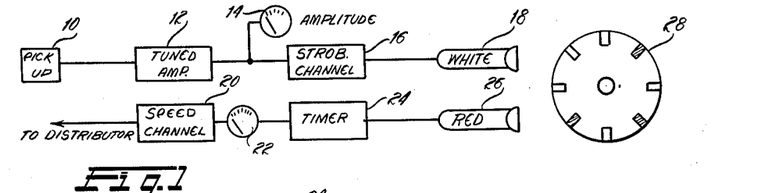
FIGURE 1 is a block diagram showing the type of apparatus used to determine the locus of unbalance in the aforementioned copending application.

Referring to FIGURE 1 there is shown an arrangement utilized in the aforementioned copending application. In the illustrated unit a pick-up or transducer 10 mounted to pick up the vibration of the engine crank shaft feeds a signal to a sharply selective amplifier 12 tuned to the frequency of rotation at which it is desired to test the engine. The output of the amplifier 12 actuates a circuit which provides an indication of vibration amplitude on the meter 14. The signal from the amplifier 12 further is fed to a stroboscope channel 16 which provides firing pulses for a white stroboscopic lamp 18. A speed channel 20 is connected to the distributor of the engine and provides upon a meter 22 an indication of engine speed. A timer 24 generates a signal of the precise frequency at which it is desired to test the engine and this signal fires a red stroboscopic lamp 26, the lamps 18 and 26 being directed at the fly wheel 28 or other engine parts driven by the engine crank shaft. The details of the foregoing equipment is described at length in the aforementioned copending application.

According to one method of operating this equipment, the engine is brought up to speed by the operator manually operating the throttle while directing the timer lamp 26 at the fly wheel 28 to determine when the proper speed is reached. As will be understood by those skilled in the art, this speed is reached when a mark or other indicia on the fly wheel remains stationary under the light of timer lamp 26. Up until the time that the exact predetermined speed is reached the mark or indicia rotates either forwards or backwards and faster or slower depending upon whether the engine is running above or below the predetermined speed and whether it is close to or far removed therefrom. As the engine approaches the desired speed the white stroboscopic lamp 18 is actuated and fires in synchronism with the vibration at crank shaft frequency.

While it might be expected that a mark or indicia would remain stationary under the illumination of this lamp at all engine speeds, it is found in practice that this is not the case. While the white lamp 18 is always fired in synchronism with the rotation of the fly wheel 28 the signal produced by the pick up passes through a tuned amplifier 12 which has a conventional phase shift versus frequency characteristic such as that shown in FIGURE 6. The slope of the curve at the mid or tuned frequency increases with the selectivity of the filter and with a tuned amplifier having the degree of selectivity preferred for the device of the invention it is found that a phase shift on the order of 45° may readily occur with a change in engine speed of approximately only one half r.p.m.

Because of this phase shift phenomena the operator in bringing the engine up to speed is presented with a picture of a red marker rotating at a slower and slower speed as the desired speed is approached and with a white marker moving at a speed generally proportional to the rate of change of engine speed. Since, it is practically impossible to hold the engine exactly at the desired speed, and since the white mark illuminated by the white lamp 18 practically never appears truly stationary because of the high phase shift for even a slight deviation from the desired speed of rotation, the operator must make his determination of the locus of unbalance by watching the red marker for the momentary instant that it is stationary and then simultaneously noting the position of the moving white marker at that instant. While this operation can be performed to secure a satisfactory balance it requires a good deal of operator skill and experience and a strict attention to the job.

Figure 6:
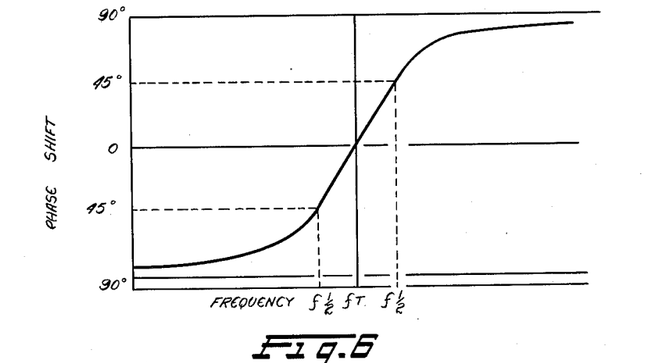
FIGURE 6 is a graph depicting the change in phase which accompanies a change in engine speed.

Whereas the foregoing description depicts a manual control of engine speed the same conditions are encountered where the governor disclosed in the aforementioned copending application is utilized for this purpose. Thus with the extremely accurate governor therein disclosed the speed of the engine is held to the desired speed within approximately one or two r.p.m. Referring to FIGURE 6, however, it will be seen that even this accurate speed control does not prevent large phase shifts which make the mark illuminated by the white lamp 18 apparently move about in a somewhat erratic manner.

Figure 2:
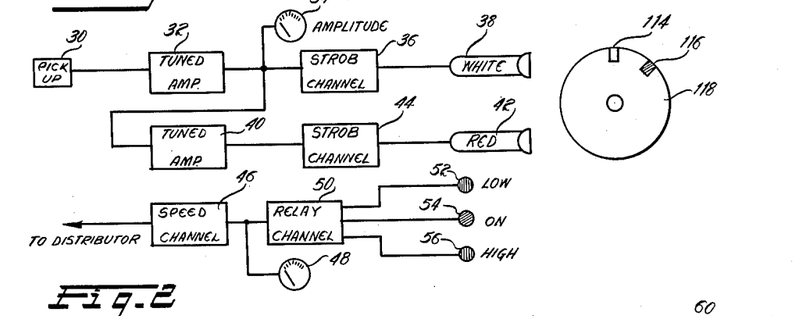
FIGURE 2 is a block diagram showing a device for determining the locus of engine unbalance according to a first embodiment of the present invention.

According to the present invention we have now found that these difficulties may be largely eliminated by means of a device such as that shown in FIGURE 2. In this unit a pick up 30 mounted to pick up crank shaft vibration feeds an input to a highly selective tuned amplifier 32 tuned to the desired frequency of rotation. The output of this amplifier operates an amplitude indicating device 34 as in the prior unit and also feeds a stroboscope channel 36 which fires a white stroboscopic lamp 38 in synchronism with crank shaft frequency vibration. The output of tuned amplifier 32 is also fed to an additional tuned amplifier 40 which is tuned to the same frequency as is the amplifier 32. The amplifier 40 may be identical to the amplifier 32 and fires a red stroboscopic lamp 42 through a stroboscope channel 44. In order to provide an indication of engine speed, a speed channel 46 of the type described in the aforementioned copending application is connected to the distributor of the engine under test and provides a signal to actuate a meter 48 which is calibrated to read engine speed. This same signal is also fed to a relay channel 50 which actuates three indicator lamps 52, 54 and 56 which respectively indicate that the speed is low, on, and high. The amplifier and stroboscope channels used in this equipment may be similar to those described in detail in the aforementioned copending application.

Figure 3:
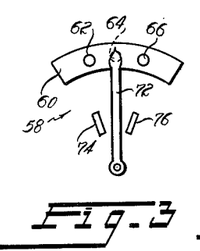
FIGURE 3 is a plan view of the movement of a meter type switch used in the embodiment of FIGURE 2.
Figure 4:
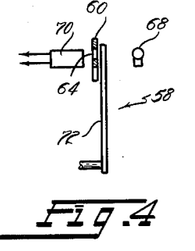
FIGURE 4 is a side elevation, partly in section, of the meter type switch shown in FIGURE 3.

The relay channel 50 consists of a meter type switch shown generally at 58 in FIGURES 3 and 4. This switch consists of a scale 60 having three apertures 62, 64 and 66 and having a lamp 68 mounted in front of the scale and a photocell 70, 73 and 75 mounted in back of each aperture. A pointer 72 actuated by a conventional meter movement traverses the front of the scale and is limited in its movement by means of a pair of stops 74 and 76 which hold the pointer in front of aperture 62 in one extreme position and in front of aperture 66 in the other extreme position. The meter switch 58 is fed with a signal from the speed channel 46 and the amplitude of this signal is adjusted by means of a potentiometer or other means so that the pointer covers aperture 64 when the engine is on speed and covers apertures 62 and 66 when the engine is below and above speed respectively.

Figure 5:
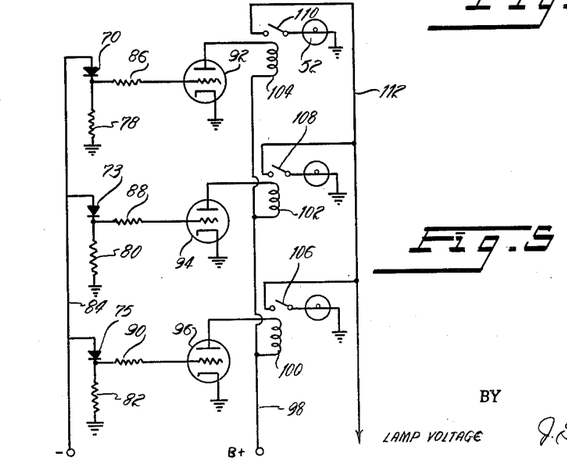
FIGURE 5 is a circuit diagram of the lamp actuating relays controlled by the meter type switch.

Referring to FIGURE 5 there is shown a circuit diagram of the relays controlling the lamps 52, 54 and 56. Each of the photocells 70, 73 and 75 has its plate connected to ground through a resistor 78, 80 and 82 and has its cathode connected through conductor 84 to the negative terminal of a power supply, not shown. Each of the photo cells has its plate connected through a coupling resistor 86, 88 and 90 to the grid of a series of triodes 92, 94 and 96 and the cathodes of these tubes are connected to ground. Voltage is fed from lead 98 to the plates of each of the foregoing tubes through a series of relays 100, 102 and 104 and each of the relays actuates a normally open switch 106, 108 and 110. One terminal of each switch is connected by a conductor 112 to a source of lamp voltage and the other terminal of each switch is connected to grounded lamps 52, 54 and 56.

As long as light from the lamp 68 reaches the various photocells the grids of their respective tubes are maintained at a high negative voltage so that the tubes are nonconducting. When, however, the pointer 72 intercepts the light from the source 68, the photocell involved becomes a high resistance so that the grid of this tube swings in a positive direction to caues the tube to conduct. This causes energization of the associated relay and closure of the relay switch to cause illumination of the particular lamp involved.

The operation of this embodiment of the invention is as follows. The circuitry controlling the white stroboscopic lamp 38 is the same as the circuitry shown in FIGURE 1 and consequently it illuminates a mark 114 which is stationary when the engine is on speed but which shifts in position when the engine is off speed due to the phase shift previously discussed. The output of the tuned amplifier 32 is fed through a similar tuned amplifier 40 which in turn introduces a similar additional phase shift into the signal which fires the red stroboscopic lamp 42. This lamp shows the marker on the flywheel as a red mark 116 which is also stationary when the engine is on speed but which, because of the phase shift, moves when the engine is off the desired speed. When the engine is running at precisely the desired speed both tuned amplifiers 32 and 40 are operating at the tuned frequency $f_t$ shown in FIGURE 6 so that there is zero phase shift in both circuits. This results in the lamps 38 and 42 illuminating apparently superimposed markers 114 and 116 and at this moment no other markers appear on the fly wheel 118.

The operator accordingly brings the engine up to speed either through the use of the amplitude indicating instrument 48 and lights 52, 54 and 56 or by means of a governor which may be of the type disclosed in the aforementioned copending application. When the engine reaches approximately the desired speed the operator watches for the superposition of the markers or for the existence of but a single marker and then notes the position of this mark. Since there is only one apparent mark at that moment and since that mark indicates the locus of unbalance the determination is vastly simplified and requires extremely little skill on the part of the operator.

Figure 7:
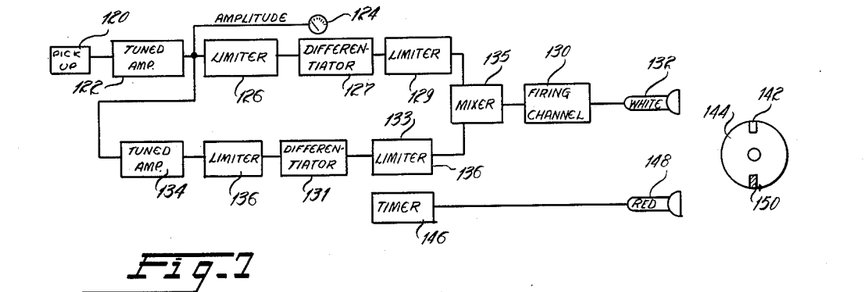
FIGURE 7 is a block diagram of a device for accurately indicating the locus of unbalance according to a second embodiment of the invention.
Figure 8:
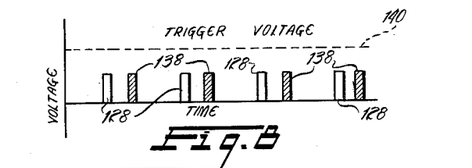
FIGURE 8 is a graphical depiction of the pulses generated in the circuit of FIGURE 7.

Referring to FIGURE 7 there is shown a second apparatus for locating the unbalance according to the invention. According to this embodiment of the invention a pick-up 120 mounted to be actuated by crank shaft vibration feeds a signal into a tuned amplifier 122 and the output of this amplifier actuates an amplitude indicating device 124. The output of tuned amplifier 122 is also fed to a limiter 126, differentiator 127 and limiter 129. The output of tuned amplifier 122 is also fed to a second tuned amplifier 134 which is likewise connected to a limiter 136, differentiator 131, and limiter 133. The outputs of the tuned amplifiers constitute sine waves which are limited or clipped to square waves by limiters 126 and 136, differentiated by differentiators 127 and 131 and again limited by limiters 129 and 133 to form a series of equal height pulses 128 and 138 as shown in FIGURE 8. These pulses are fed to a mixing circuit 135 shown in detail in FIGURE 17 and this mixing circuit feeds an input to stroboscope firing channel 130.

Figure 17:
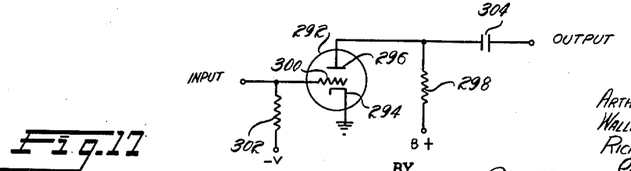
FIGURE 17 is a circuit diagram of the mixing circuit utilized in FIGURES 7 and 15.

Referring to FIGURE 17, the mixing circuit consists of a triode 292 having its cathode 294 grounded and its plate 296 connected through a load resistor 298 to a supply of plate potential. The grid 300 of triode 292 is connected through resistor 302 to a bias supply which normally maintains the triode 292 in a cut off condition. The grid 300 also serves as the input to the mixing circuit. The output of the circuit is taken off of the load resistor 298 through a condenser 304. The triode 292 is normally in a cut off or non-conducting condition so that its plate 296 is substantially at the plate supply voltage. When the grid 300 receives an input pulse sufficient to cause the tube to conduct the plate voltage drops substantially to zero for the duration of the pulse and then again resumes the plate supply potential. If the bias voltage on the grid 300 is normally adjusted so that the tube is caused to conduct only when the pulses from limiters 129 and 133 occur simultaneously, as shown in FIGURE 9, the mixing circuit produces a single pulse only when this condition occurs.

Figure 9:
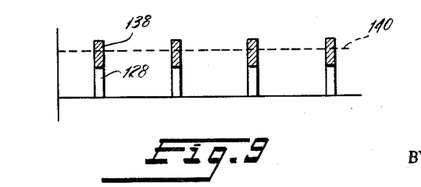
FIGURE 9 is another graphical depiction of the pulses generated in the circuit of FIGURE 7.

When the engine is operating at the speed to which the amplifiers 122 and 134 are tuned the phase shift introduced by each amplifier is zero and consequently the pulses 128 and 138 occur simultaneously and are additive as shown in FIGURE 9. The trigger voltage for the control tube in the mixing circuit 135 is set at a value which is greater than the amplitude of either one of the pulses but which is less than the combined amplitude of the added pulses as is indicated by the dotted line 140 in FIGURES 8 and 9. It will thus be apparent that the white stroboscopic lamp 132 fires only when the engine is running at the desired speed and illuminates but a single mark 142 on the fly wheel 144. A timer 146 fires a red stroboscopic lamp 148 at the desired frequency of rotation in order to provide the operator with a means for bringing the engine to approximately the desired speed.

The operation of this embodiment of the invention is as follows. The operator brings the engine up to approximately the desired speed as by means of the timer 146 and red lamp 148 or by means of a governor which may be of the type disclosed in the aforementioned copending application. If the red stroboscopic lamp 148 is utilized it illuminates a red marker 150 which moves at all speeds except the desired speed. The white stroboscopic lamp 132 fires only when the engine is running at precisely the predetermined speed and produces a stationary white marker, 142.

The operator thus looks only for the white marker and once he sees it and notes its position he has located the locus of unbalance irrespective of the position or movement of the red marker at that time. The red marker actually is stationary at that moment although the operator need pay no attention to this since the mere existence of the white mark indicates that the engine is on speed. By using pulses 128 and 138 on the order of one micro second it is possible to fire the white lamp 132 when the engine is running at the desired speed within a tolerance of approximately plus or minus 0.01 r.p.m., a change in frequency so small that the white mark 142 appears stationary for all practical purposes.

It will be understood that where a red mark and a white mark are referred to in this specification this refers to the appearance of a single mark under the light of a red and a white stroboscopic lamp. Different colored lamps could obviously be used. While plural marks or indicia could be used upon the fly wheel a single mark is generally preferable and will appear as plural marks under the light of the two lamps as described in detail heretofore.

Figure 20:
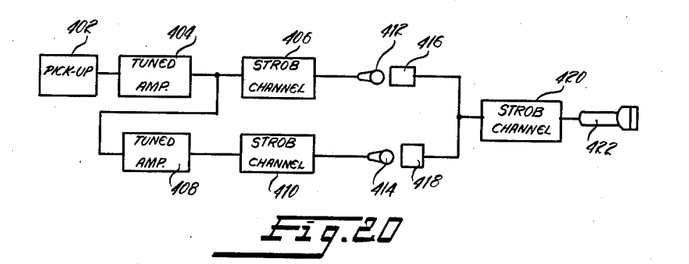
FIGURE 20 is a block diagram of another embodiment of a one lamp device for indicating the locus of unbalance.
Figure 21:
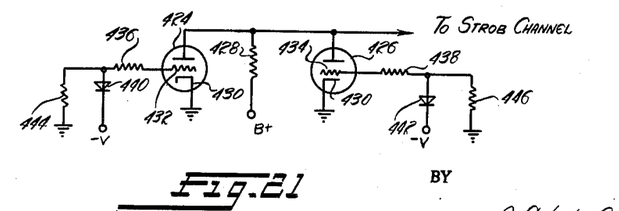
FIGURE 21 is a diagram of the photocell circuit utilized in the device of FIGURE 20.

While we have shown in FIGURE 7 one means of firing a single lamp only when the engine to be balanced is running at precisely the desired speed, it will be understood by those skilled in the art that other circuit arrangements may be utilized for this purpose and one such arrangement is shown in FIGURES 20 and 21. Referring to FIGURE 20 there is shown a pick up 402 connected to a tuned amplifier 404 and stroboscope channel 406. The output of the tuned amplifier 404 is also connected to a further tuned amplifier 408 which drives a stroboscope channel 410. Stroboscope channels 406 and 410 operate stroboscopic lamps 412 and 414 which are mounted visual proximity to a pair of photocells in photocell circuits 416 and 418. The outputs of the photocell circuits 416 and 418 are fed to a stroboscope channel 420 which operates a lamp 422.

Referring to FIGURE 21 the photocell circuits consist of a pair of triodes 424 and 426 receiving plate voltage through a common load resistor 428. The cathodes 430 of both tubes are grounded and the grids 432 and 434 are connected through resistors 436 and 438 to one terminal of the photocells 440 and 442, the other terminals of the photocells being connected to a supply of negative bias voltage. Resistors 444 and 446 are connected from the upper photocell terminals to ground.

As has been explained in connection with the previous embodiments of the invention, the output of tuned amplifier 404 and the output of tuned amplifier 408 are in phase only when the engine is running at the desired speed and it is desired to operate the stroboscopic lamp 422 only when this in phase condition is obtained. Stroboscopic lamps 412 and 414 fire in synchronism with the signals from the two tuned amplifiers and the flashes from these lamps occur simultaneously only when the signals from the tuned amplifiers are in phase. Referring to FIGURE 21, the triodes 424 and 426 are normally in a conducting condition when the stroboscopic lamps 412 and 414 are off and the photocells 440 and 442 are not illuminated. Under this condition the plates of the tubes are substantially at ground potential. When either stroboscopic lamp 412 or 414 goes on and illuminates its corresponding photocell, as for instance photocell 440, photocell 440 becomes a low resistance thereby negatively biasing the grid 432 and causing tube 424 to cease conducting. When tube 424 ceases to conduct its plate tends to assume supply potential and will do so if tube 426 is not conducting at that time. As long as one tube is conducting the plate potential of both tubes and the signal to the stroboscope channel is substantially zero. When both tubes cease to conduct simultaneously upon simultaneous illumination of their photocells the plate potential of both tubes is substantially the plate supply voltage and this is fed to the stroboscope channel to trigger the stroboscopic lamp 422. It will thus be seen that the stroboscopic lamp 422 fires only when the signals from tuned amplifiers 404 and 408 are in phase and the engine is running at precisely the desired speed.

As an engine approaches the proper operating speed for balancing the amplitude of vibration indicated by meters such as 14, 34 and 124 varies and the operator must thus not only watch for the indication of the position of unbalance, but while watching the stroboscopic light flashes must also note the amplitude of vibration at the time that the lights indicate the locus of unbalance. We have found that even this necessity of operator skill may be avoided by the provision of a novel engine analyzer wherein the amplitude meter reading locks at the maximum amplitude of crank shaft frequency vibration in any given half cycle and is held there until reset by the operator. An engine analyzer of this type is shown in FIGURES 10 and 11 of the drawings.

While the embodiments of the invention previously discussed have been disclosed as containing but a single pick up, the equipment is ordinarily utilized with a pair of pick ups, one being mounted to pick up the vibration on the front of the engine and the other being mounted to pick up the vibration on the rear of the engine as disclosed in detail in assignee's copending application Serial No. 521,744. The embodiment of the invention shown in FIGURE 10 is illustrated as having such a pair of pick-ups and is also provided with a plane separation device which insures that each pick-up responds only to the vibration produced by an unbalance which exists on its side of the center of inertia of the vibrating body.

An unbalanced rigid rotor can be balanced by adding or subtracting weight in two or more arbitrarily chosen planes perpendicular to the axis of rotation, which, in the instance of engines, would be planes passing through the bearings at the front and rear of the engine. When the effect of unbalance in each of these planes is removed the rotor is both statically and dynamically balanced. In actual practice, however, the vibrations occurring at either end of the rotor, i.e., the front or rear of the engine, are caused not only by the unbalanced mass associated solely with that rotor end, but rather by the combined action of the two unbalanced masses acting at both rotor ends. That is to say, the vibration picked up by a pick-up at the rear of the engine is caused not only by unbalance at the rear of the engine but also by unbalance at the front of the engine which produces a vibration at the rear due to cross effect. Consequently, in order to locate either the front or rear unbalance masses by observations of the vibrations occurring at either end of the rotor, it is necessary to eliminate from such observations the effects of all but the selected mass. In the embodiment of our invention shown in FIGURE 10 we have provided an electronic means for accomplishing this elimination of the undesired vibration signals.

Figure 10:
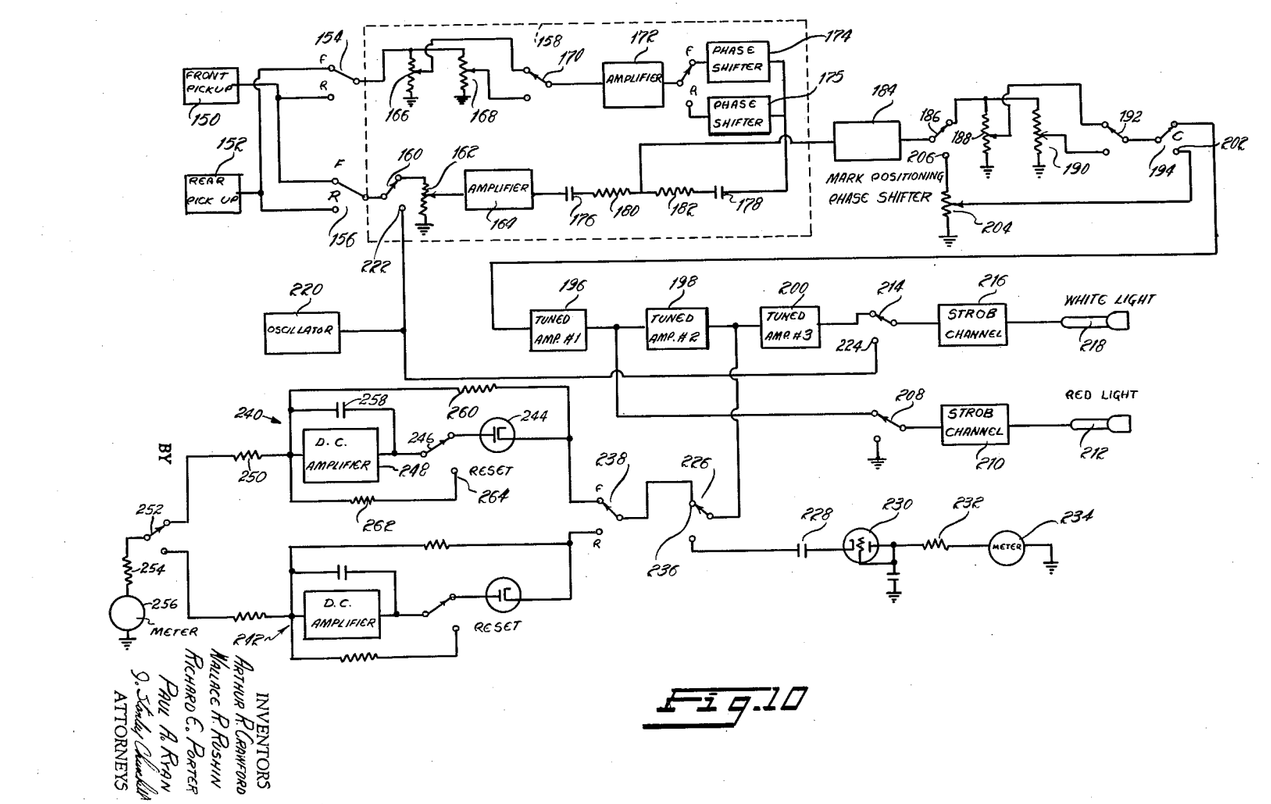
FIGURE 10 is a circuit diagram of an engine analyzer containing a plane separation unit and having means for holding the reading of the amplitude of vibration meter until this is reset by the operator.
Figure 11:
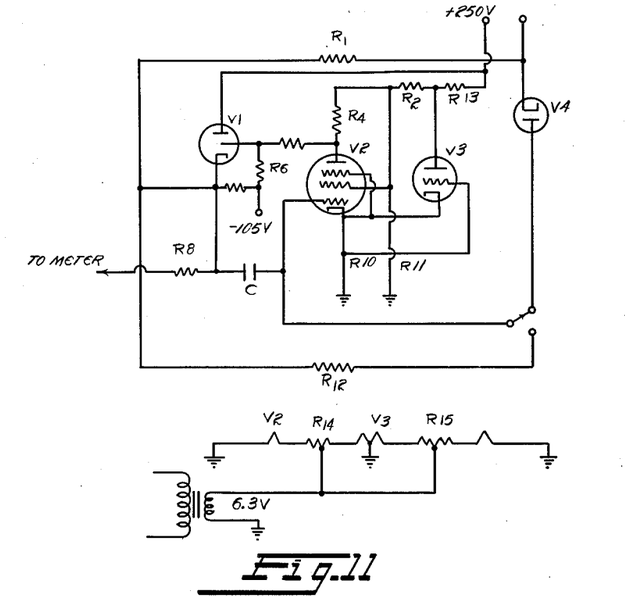
FIGURE 11 is a circuit diagram of the D.C. amplifier utilized in the embodiment of the invention of FIGURE 10.

Referring to FIGURE 10 there is shown an engine analyzer having a front pick-up 150 and rear pick-up 152 attached to pick up the vibration from the front and rear of an automobile engine. The outputs from these pick-ups are passed through a pair of pick-up selector switches 154 and 156 which are connected to the plane separation unit 158. As the switches are shown in the drawing the unit is connected to indicate the amount and position of unbalance at the front end of the engine and, in this position, the signal from the front pick-up passes through switch 156 to and operate-check selector switch 160 and thence through a potentiometer 162 to an amplifier 164. Simultaneously the output from rear pick-up 152 passes through switch 154 to a pair of calibration potentiometers 166 and 168, potentiometer 166 being for the front of the engine and potentiometer 168 being for the rear of the engine. From potentiometer 166 the signal passes through a pick-up selector switch 170 to amplifier 172 and the output of this amplifier is fed through a phase shifter 174. The outputs of amplifier 164 and phase shifter 174 are mixed by condensers 176 and 178 and resistors 180 and 182 and the mixed signal is thence fed to a mark positioning phase shifter 184. The phase shifter 174 may be of any conventional type capable of producing at least a 180° phase shift and is preferably of the type described in detail in the A.R.R.L. Amateur Radio Handbook, page 114, 1952 edition.

The plane separator unit 158 is adjusted as follows: The calibrating potentiometer 162 is first adjusted to insure uniform gain over the operating range of the amplifiers in the manner described in detail in assignee's aforementioned copending application. A known weight is then placed upon the front end of a balanced engine of the type which is to be mass produced and balanced and the engine is run up to operating speed. The pick-up selector switches are then switched to the rear switch so that the amplitude meter indicates the unbalance at the rear of the engine. Since the engine was originally balanced it is known that any reading of this meter is being produced by the known unbalance deliberately inserted into the front end of the engine. The potentiometer 168 and phase shifter 174 are consequently adjusted until this meter reads zero. The engine is then stopped, the known unbalance of the front end removed, and a known unbalance placed at the rear of the engine. The engine is again brought to speed and the pick-up selector switches moved to a front position so that the amplitude meter reads the vibration of the front of the engine caused by the known unbalance weight secured to the rear of the engine. Potentiometer 166 and phase shifter 175 are then adjusted until the amplitude meter reads zero. If the motion responses of the engine were completely linear this would complete the adjustment of the plane separator. Experience has shown, however, that the motion responses of rotors balanced in their own bearings are only approximately linear with respect to the forces and consequently it is necessary to repeat the foregoing procedure until an unbalance weight on the front of the engine causes no reading of the amplitude meter on the rear of the engine and vice-versa. Once the plane separator has been adjusted in this manner it retains its adjustment for all engines of the same type balanced at the same speed on the same mount. A more detailed discussion of this type of plane separation may be found in Baker et al. Patent Serial No. 2,165,024, issued July 4, 1939. The mark positioning phase shifter 184 is provided so that the stroboscopic mark indicating the position for weight correction will be located at a convenient position as is pointed out in complete detail in assignee's aforementioned copending application.

From the mark positioning phase shifter 184 the signal is fed through an operate-check switch 186 to a pair of calibrating potentiometers 188 and 190 which are utilized to calibrate the meter as described in said copending application. From the potentiometers 188 and 190 the signal is fed through a pick-up selector switch 192 and operate-check switch 194 to a series of tuned amplifiers 196, 198 and 200 which may be of any sharply tuned type but which are preferably of the type disclosed in assignee's copending application. The check terminal 202 of switch 194 is connected to the movable contact of a potentiometer 204 and this is connected between check terminal 206 of switch 186 and ground for a reason presently to become apparent.

The output of tuned amplifier 196 is fed through an operate-check switch 208 to a stroboscope channel 210 of the same type as discussed in the preceding embodiments of the invention and the output of this channel fires a red stroboscopic light 212. The output of tuned amplifier 200 is fed through an operate-check switch 214 to a stroboscopic light channel 216 and thence to a white stroboscopic light 218. These lights operate in the same manner as the embodiment of the invention illustrated in FIGURE 2 except that an additional tuned amplifier is provided in order to facilitate accurate determination of the position of unbalance. Reference to FIGURE 6 will show that with two tuned amplifiers, such as in the embodiment of the invention shown in FIGURE 2, the maximum spacing of the red light and white light on the moving body is 90°. With three amplifiers this spacing is extended to 180° and the red light moves twice as fast in getting into a superposed position.

A check oscillator 220 delivers a 25 cycle fixed amplitude check signal to the check contact 222 of operate-check switch 160 and also delivers this output to check contact 224 of operate-check switch 214. This frequency of 25 c.p.s. is equal to 1500 r.p.m. which is the speed at which it is desired to test the engine. The output of the second tuned amplifier 198 may be connected through an operate-check switch 226 to a coupling condenser 228 and thence to a diode connected triode 230. The plate of the triode 230 is connected through resistor 232 to a check meter 234 which is connected to ground. When it is desired to check the operation of the amplifier circuits the operate-check switches are moved to the check position whereby a signal is fed through amplifier 172 and tuned amplifiers 196 and 198 to the diode connected triode 230 and meter 234. If the circuits are operating properly and the overall gain is correct the meter 234 will indicate this fact.

The operate terminal 236 of operate-check switch 226 is connected through a pick-up selector switch 238 to a pair of amplitude indicating circuits 240 and 242 which respectively handle the front and rear pick-up signals. Inasmuch as these circuits are identical only the circuit 240 corresponding to the front pick-up will be described in detail. The signal from the second tuned amplifier 198 is fed through a diode 244 and reset switch 246 to a D.C. amplifier 248 which has its output connected through a resistor 250 to a front rear switch 252 and thence to a resistor 254 and meter 256. A memory condenser 258 is connected around the amplifier 248 and a stabilizing resistor 260 is connected around the diode 244 and D.C. amplifier 248. A reset discharge resistor 262 is connected to the output of the amplifier 248 and to the reset contact 264 of reset switch 246.

Figure 12:
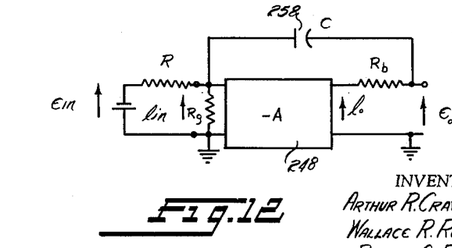
FIGURE 12 is a simplified diagram of the holding circuit of FIGURE 10.

The circuit 240 produces a D.C. voltage on the meter 256 which is proportional to the maximum value reached by a time varying input signal over a cycle of operation. The condenser 258 is used in the circuit as a memory device and the normal discharge time of the condenser is greatly increased by the use of a capacitive feed back amplifier. The operation of the circuit is herewith described in connection with simplified FIGURES 12, 13 and 14. Referring to FIGURE 12 there is shown a D.C. amplifier 248 having a gain equal to $-A$ ($A$ being a positive number) and having a feed back loop completed by the condenser 258. The amplifier has an input impedance $R_g$ and an output impedance $R_b$, and the input voltage source has an impedance of $R$. Any stable D.C. amplifier may be utilized which satisfies the following equations:

$$-A = e_o/e_{in} \qquad (1)$$

$$E_{max} \leq e_{in} \leq 0 \qquad (2)$$

Figure 13:
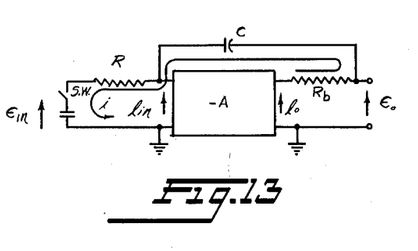
FIGURE 13 is a further simplified diagram of the holding circuit of FIGURE 10.

In calculating the transient response to a suddenly applied input voltage it is assumed that $R_g$ is very much greater than $R$ and $R_g$ is therefore neglected in the calculation of the charging transient. Referring to FIGURE 13 it is possible to write the following equations:

$$-E_{in} + E_o = iR + \frac{1}{c}\int_0^t i\,dt \qquad (3)$$

$$E_o = e_o - iR_b = -i(AR + R_b) - AE_{in} \qquad (4)$$

$$-E_{in} + E_o = \frac{-AE_{in}R - E_oR}{AR + R_b} + \frac{1}{c}\int_0^t \frac{-AE_{in} - E_o}{AR + R_b}dt \qquad (5)$$

$$E_o[(A+1)R + R_b] + \frac{1}{c}\int_0^t E_o\,dt = E_{in}\left(R_b - \frac{A}{c}t\right) \qquad (6)$$

Since the generator source impedance $R$ is normally of the same order of magnitude as the amplifier output impedance $R_b$, and $A$ is normally very much greater than 1, $(A+1)R_c$ is very much greater than $R_b$. In view of this inequality a solution for the foregoing equation is:

$$E_o = AE_{in}\left(e^{-\frac{t}{(A+1)RC}} - 1\right) \qquad (7)$$

This indicates that the charging time constant is dependent upon $R$ and is equal to $(A+1)RC$.

Figure 14:
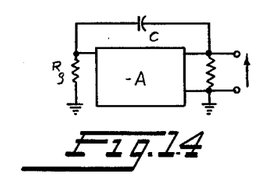
FIGURE 14 is still a further simplified diagram of the holding circuit of FIGURE 10.

With respect to the transient response for the discharge of the storage capacitor; when $E_o$ has reached the steady state value of $-AE_{in}$ the switch in FIGURE 13 is open and $E_o$ approaches zero. This circuit is shown in FIGURE 14. Here the effects of $R_b$ have been neglected by assuming that $R_g$ is very much greater than $R_b$.

The equation for the output voltage as a function of time is:

$$E_o(A+1) + \frac{1}{R_gC}\int_0^t E_o\,dt = A(A+1)E_{in} \qquad (8)$$

Where it is assumed that $E_o$ has previously reached the steady state value of $-AE_{in}$ a solution for the foregoing equation is:

$$E_o = AE_{in}e^{-\frac{t}{(A+1)R_gC}} \qquad (9)$$

This shows that the discharge time constant is a function of the amplifier input impedance and is equal to $(A+1)R_gC$.

From Equations 7 and 9 it can be seen that the only effect of changes in amplifier gain is to cause an almost proportional change in the charge and discharge time constants which is of little or no importance in this particular application. In order to provide stability in this circuit and to prevent thermal voltages in the diode 244 from causing instability in the meter reading we have found it desirable to utilize a stabilizing resistor 260 to feed back a signal equal to the amplifier output voltage.

While it is possible to utilize any stable D.C. amplifier which can be adjusted to show a zero output when the input is zero a preferred D.C. amplifier circuit is shown in FIGURE 11 and the values for the various elements of the circuit are shown in the following table:

| | |
|---|---|
| $V_1$ | 12AT7 |
| $V_2$ | 6AU6 |
| $V_3$ | 12AV7 |
| $V_4$ | ---- |
| $R_1$ | 150K |
| $R_2$ | 4.7K |
| $R_3$ | 120K |
| $R_4$ | 1M |
| $R_5$ | 3M |
| $R_6$ | 16M |
| $R_7$ | 68K |
| $R_8$ | 39K |
| $R_9$ ohms | 330 |
| $R_{10}$ do | 220 |
| $R_{11}$ | 39K |
| $R_{12}$ ohms | 220 |
| $R_{13}$ | 12K |
| $R_{14}$ ohms | 10 |
| $R_{15}$ do | 10 |
| C μf | 2 |

This amplifier may be adjusted to satisfy Equations 1 and 2 by adjustment of potentiometers $R_{14}$ and $R_{15}$ which vary the filament supply voltage.

It will be apparent from the foregoing that the meter 254 reads the maximum value reached by the unbalance signal and will hold this reading for a period of time limited only by the leakage resistance of memory capacitor 258. With a capacitor of reasonably good quality it is possible to hold the reading for a period of upwards of 5 minutes with less than a 2% drop in meter reading. This permits the operator to give his undivided attention to accurately locating the position of unbalance since it is no longer necessary to simultaneously note the amplitude of unbalance.

While all of the preceding embodiments of our invention have utilized stroboscopic lights to indicate the position of unbalance we have now found that position of unbalance may be indicated on a meter thereby completely eliminating operator skill from the balancing of an engine. One embodiment of an engine analyzer having an indicator of this type is shown in FIGURES 15 and 16.

Figure 15:
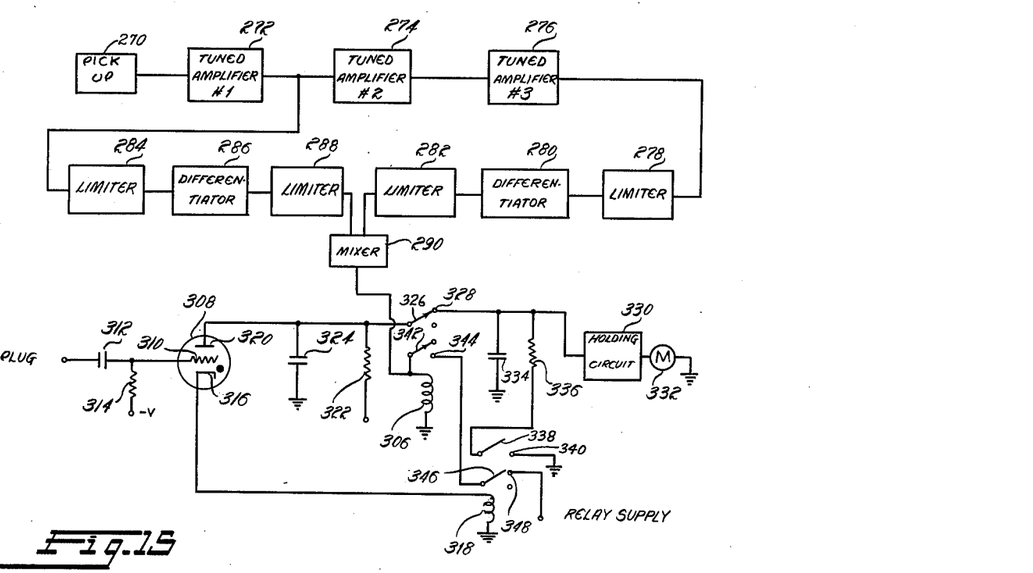
Figure 16:
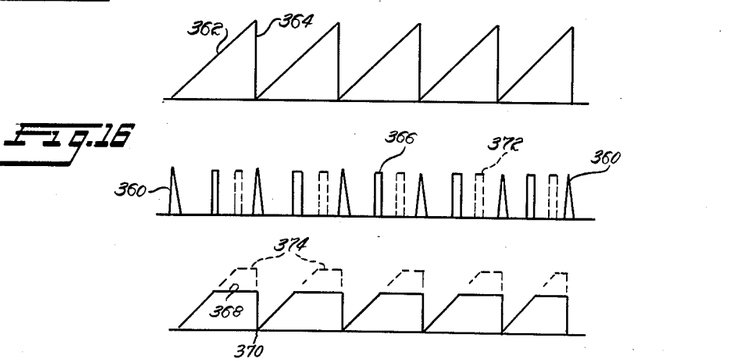
FIGURE 16 is a graphical depiction of the wave shapes produced in the circuit of FIGURE 15.

Referring to FIGURE 15 there is shown a pick-up 270 connected to a series of cascaded tuned amplifiers 272, 274 and 276 and the output of the final tuned amplifier 276 is connected to a limiter 278, differentiator 280 and limiter 282. The output of the first tuned amplifier 272 is likewise connected to a limiter 284, differentiator 286 and limiter 288. The output of the tuned amplifiers is a sine wave and this is limited or clipped to a square wave by the limiters 278 and 284, is differentiated to form a sharp pulse by the differentiators 280 and 286 and is then limited by limiters 282 and 288 to form a series of equal height pulses of the type shown in FIGURE 8. These pulses are delivered to a mixing circuit 290 of the type shown in FIGURE 17 and described in detail heretofore. The output of the mixing circuit 290 is connected to ground through a relay operating coil 306.

A triode 308 which is preferably a gas tube has its grid 310 connected through coupling condenser 312 to one of the spark plugs of the engine. Any spark plug may be utilized so long as the fly wheel or other crank shaft mounted object is marked to show the position of the crank shaft at the time that the selected plug fires. The grid 310 of triode 308 is connected through a resistor 314 to a bias supply voltage and the cathode 316 is connected to ground through a second relay operating coil 318. The plate 320 of the triode is connected to a supply of plate potential through a load resistor 322 and is also connected to a grounded condenser 324. Plate 320 is connected to a normally closed switch 326 actuated by the relay operating coil 306 and the other contact 328 of this switch is connected to a holding circuit 330 of the type described in connection with FIGURE 10. The holding circuit actuates the meter 332. A follower capacitor 334 is connected between contact 328 and ground and a discharging resistor 336 is connected between contact 328 and the movable arm 338 of a normally open switch actuated by the relay operating coil 318. The other contact 340 of this switch is connected to ground. The ungrounded end of relay actuating coil 306 is connected to the movable arm 342 of a normally open switch operated by that coil and the other contact 344 of this switch is connected to the movable arm 346 of a normally closed switch actuated by the relay operating coil 318. The other contact 348 of this switch is connected to a source of relay supply voltage.

The operation of this circuit is as follows: The pick-up 270 and tuned amplifiers 272, 274 and 276 produce a crank shaft frequency vibration signal which is a sine wave because of the action of the tuned amplifiers. When the engine is running at the desired speed there is a zero phase shift produced in each amplifier whereas a phase shift increasing up to 90° is produced in each amplifier as the signal varies from the predetermined frequency as explained in detail heretofore. The sine wave output of tuned amplifier 272 is transformed into a series of square pulses of equal height by the action of limiter 284, differentiator 286 and limiter 288 and the output of tuned amplifier 276 is similarly transformed into square wave pulses of equal height by limiter 278, differentiator 280 and limiter 282.

As explained heretofore in connection with the embodiment of the invention shown in FIGURES 7, 8 and 9, the pulses from tuned amplifier 272 and tuned amplifier 276 occur simultaneously and are additive only when the engine is running at precisely the desired speed. The bias voltage on the grid 300 of the mixing circuit triode 292 (FIGURE 17) is chosen so that tube 292 remains cut off unless the pulses from the limiters 282 and 288 occur simultaneously and are thus additive to produce a voltage sufficient to override the bias and cause tube 292 to conduct. When this occurs a pulse is fed through coupling condenser 304 to relay operating coil 306 to actuate movable arms 326 and 342. Arm 342 is closed by this action and relay operating coil 306 is connected to a source of relay supply voltage through movable arm 342, contact 344, movable arm 346 and contact 348 to form an interlock circuit which holds relay operating coil 306 in an energized condition until the subsequent actuation of relay operating coil 318. Tube 308 which is normally maintained in a non-conducting condition by means of a negative bias on its grid 310, receives input pulses from a spark plug on the engine and these input pulses are shown graphically at 360 in FIGURE 16. As long as tube 308 is in a non-conducting condition the condenser 324 charges through resistor 322 from the supply of positive voltage and produces a rising voltage as shown at 362 in FIGURE 16. Upon the occurrence of a spark plug pulse on the grid of tube 308 the tube fires and discharges condenser 324 as shown at 364 in FIGURE 16. If no other control signals were fed into the circuit this tube would produce a saw tooth wave as shown at 362 and 364. Condenser 324 is connected through movable arm 326 and contact 328 to follower condenser 334 across which appears the same saw tooth wave 362, 364.

It will be noted that one cycle of this saw tooth wave is equivalent to one full revolution of the engine and if the time of firing of the plug controlling tube 308 is taken as a reference point it is possible to locate the position of unbalance by determining the locus of such unbalance with relation to the firing of this spark plug. The signal from the mixer 290, which is shown at 366 in FIGURE 16, causes actuation of relay operating coil 306 to move operating arm 326 downwardly and thereby break the connection between condenser 324 and follower condenser 334. When this occurs condenser 324 continues to charge but condenser 334 merely maintains its charge as shown at 368 in FIGURE 16. As pointed out heretofore, actuation of relay operating coil 306 closes an interlock circuit through arm 342, contact 344, arm 346, and contact 348 to hold relay operating coil 306 in an actuated condition. This condition prevails until the next pulse 360 from the spark plug whereupon condenser 324 is discharged. The discharge pulse through tube 308 flows from its cathode 316 to relay operating coil 318 to open the interlock circuit which was maintaining relay operating coil 306 in an actuated condition. This allows arm 326 to again engage contact 328 so that when condenser 324 again commences to charge, as shown at 370, condenser 334 follows. At the end of each cycle when tube 308 fires, the actuation of relay operating coil 318 also closes the switch constituted by arm 338 and contact 340 to discharge condenser 334 through resistor 336. The wave shapes thus produced are shown in FIGURE 16.

It will thus be seen that the amplitude of the signal 368 produced across condenser 334 is dependent upon the time lag between the firing of the spark plug and the occurrence of the pulses from the mixing circuit 290, the larger the time lag the higher the amplitude of signal 368. Considering the case of a larger time lag, let it be assumed that the mixing circuit is producing a series of pulses 372 which provide a signal 374 across condenser 334. This signal passes through holding circuit 330 and causes a meter reading which is higher than that obtained with the time lag between pulses 360 and 366 and which is a function of this time lag. Once the meter has been caused to register the engine may be stopped, the crank shaft rotated to a reference mark so that the crank shaft is in the position it occupies when the selected spark plug fires, the angular distance indicated on meter 332 measured off on the fly wheel, and the weight indicated by the amplitude meter added at this point to complete the balancing operation. Both the amplitude meter and the phase indicating meter may be provided with holding circuits so that the operator need only run the engine up to speed and then stop it without the necessity of even looking at the meters until he is ready to perform the actual step of adding weight to balance the engine.

While the circuits shown in FIGURE 15 utilizes relays 306 and 318 it will be understood by those skilled in the art that these may be replaced by electronic circuits which perform the same function.

Figure 18:
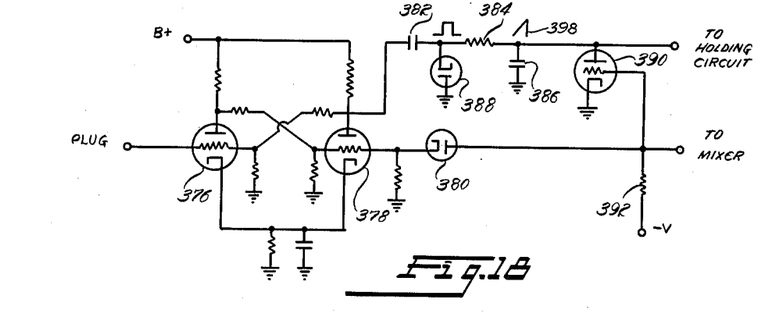
FIGURE 18 is a circuit diagram of still a further embodiment of a circuit for indicating phase by means of a meter.
Figure 19:
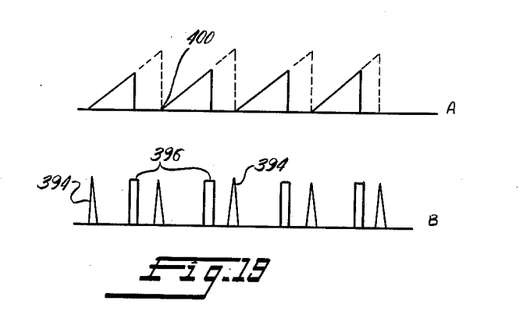
FIGURE 19 is a graphical depiction of the wave shape produced in the circuit of FIGURE 18.

Referring to FIGURE 18 there is shown a different type of circuit for performing the phase indication function. In this circuit a pair of triodes 376 and 378 are connected in an Eccles-Jordan multi-vibrator circuit wherein tube 376 receives an input from the plug and tube 378 receives an input from the mixing circuit through the diode 380. The signal from the plate of diode 378 is fed through a coupling condenser 382 to an integrating circuit consisting of resistor 384 and condenser 386 and this signal is clamped by means of a clamping diode 388. A triode 390 is connected across the condenser 386 and has its grid connected to a supply of bias voltage through resistor 392 and also connected to the input from the mixing circuit. Assuming that triode 378 is in a conducting condition and triode 376 is in a non-conducting condition, the voltage at the cathode of the clamping diode 388 is zero. When a pulse is received from the plug tube 376 is triggered into a conducting condition while tube 378 becomes non-conducting to thereby raise the voltage on the cathode of the clamping diode 388 to approximately the plate supply potential. When diode 388 is raised to this potential condenser 386 commences to charge so that a saw tooth wave is produced at the plate of triode 390. As the voltage at the plate of triode 390 continues to rise as condenser 386 charges a pulse is received from the mixing circuit through diode 380 onto the grid of triode 378 causing this tube to be triggered into a conducting condition. This causes triode 376 to cut off and the voltage at the cathode of the clamping diode 388 is reduced to zero. At the same time triode 390 becomes conducting to discharge condenser 386. Thus referring to FIGURE 19 it will be seen that each spark plug pulse 394 causes the condenser 386 to commence charging and this continues until a pulse 396 is received from the mixing circuit to trigger tube 378 whereby the condenser 386 is shorted by triode 390 to bring the voltage at the plate of triode 390 to zero as shown at 398. The same pulse causes triode 378 to become conducting so that the voltage on the cathode of clamping diode 388 is reduced to zero and remains at this value until the point 400 is reached where another spark plug pulse 394 again causes tube 376 to conduct and raise the voltage on the cathode of clamping diode 388. It will thus be seen that the peak voltage of the wave form shown on axis A in FIGURE 19 is a function of the time interval between the firing of the spark plug and the occurrence of the pulse from the mixing circuit and this is a measure of the angular separation between the reference point on the fly wheel and the point of unbalance as pointed out heretofore in connection with the embodiment of the invention shown in FIGURES 15-17. This signal is thence fed to the holding circuit so that this measure of position of unbalance is read upon a meter such as is shown in FIGURE 15. It will be appreciated by those skilled in the art that while holding circuits are shown in these embodiments of the invention it is also possible to utilize a simple meter which is calibrated to read position of unbalance.

It will be apparent from the foregoing that by means of the apparatus of this invention it is possible to eliminate the difficulties previously encountered in balancing engines by means of equipment of the type disclosed in the aforesaid copending application. The apparatus of this invention makes possible quick and accurate engine balancing without the operator possessing any particular skill and without the necessity for the operator having any particular previous experience with the apparatus. This application is a continuation in part of assignee's copending application Serial No. 521,744, filed July 13, 1955, for engine analyzer and balancer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a balancing machine for balancing a rotating rotor through the use of stroboscopic light, a pick up for producing a vibration signal, a first tuned amplifier for amplifying said signal and producing a first output signal, a second tuned amplier for amplifying the output signal of said first tuned amplifier, lamp means for producing said stroboscopic light, said lamp means being fired by the two output signals from said first and second tuned amplifiers, said signals cooperating to fire said lamp means in a manner to indicate the locus of the unbalance mass causing said vibration signal when said rotor is rotating at a predetermined speed, means for indicating the amplitude of said vibration signal, and holding means connected to said indicating means and receiving a signal from at least one of said amplifiers, said holding means maintaining on said indicating means a steady state D.C. voltage which is a function of the signal actuating said holding means, said holding means holding said voltage on said indicating means after said signal has disappeared.

2. A device as set out in claim 1 wherein said holding means comprises a D.C. amplifier, a one way conducting device having one terminal thereof connected to the input of said amplifier and receiving a signal from at least one of said amplifiers, said indicating means being connected to the output of said D.C. amplifier, a memory condenser connected between the input and output of said amplifier, and a stabilizing resistor connected between the output of said amplifier and the other terminal of said one way conducting device.

3. A vibration amplitude indicating instrument comprising a pick-up for producing a vibration signal, amplifying means amplifying said signal, visual indicating means, and holding means connected to said indicating means and receiving a signal from said amplifying means through a unidirectional conducting device, said holding means maintaining on said indicating means a steady state D.C. voltage which is a function of the signal actuating said holding means, said holding means including a condenser charged through said unidirectional conducting device and associated with means for increasing its normal discharge time for holding said voltage on said indicating means after said signal has disappeared.

4. A vibration amplitude indicating instrument comprising a pick-up for producing a vibration signal, amplifying means amplifying said signal, a D.C. amplifier, a one way conducting device having one terminal thereof connected to the input of said amplifier and having its other terminal connected to said amplifying means, an indicating device connected to the output of said amplifier, a memory condenser connected between the input and output of said amplifier, and a stabilizing resistor connected between the output of said amplifier and the other terminal of said one way conducting device.

5. An indicating device holding circuit for holding the maximum per cycle voltage of a periodic signal comprising a D.C. amplifier, a one way conducting device having one terminal thereof connected to the input of said amplifier, an indicating device connected to the output of said amplifier, a memory condenser connected between the input and output of said amplifier, and a stabilizing resistor connected between the output of said amplifier and the other terminal of said one way conducting device.

6. A meter holding circuit comprising a D.C. amplifier having a zero output at zero input, a diode having one terminal thereof connected to the input of said amplifier, a meter connected to the output of said amplifier, a memory condenser connected between the input and output of said amplifier, and a stabilizing resistor connected between the output of said amplifier and the other terminal of said diode.

7. In a balancing machine for balancing through the use of stroboscopic light, a pick-up for producing a vibration signal, a first tuned amplifier for amplifying said signal, a second tuned amplifier for amplifying the output of said first tuned amplifier, lamp means for producing said stroboscopic light, said lamp means being fired by the two output signals from said first and second tuned amplifiers.

8. In a balancing machine for balancing a rotating rotor through the use of stroboscopic light, a pick-up for producing a vibration signal, a first tuned amplifier for amplifying said signal, a second tuned amplifier for amplifying the output of said first amplifier, a first stroboscopic lamp connected to be fired by the output of said first amplifier, and a second stroboscopic lamp connected to be fired by the output of said second amplifier, said lamps being fired in response to said vibration signal to produce stroboscopic light flashes which cooperate to indicate the locus of an unbalance mass on said rotor when said rotor is rotating at a predetermined speed.

9. In a balancing machine for balancing through the use of stroboscopic light, a pick-up for producing a vibration signal, a first tuned amplifier for amplifying said signal, a second tuned amplifier tuned to the same frequency as said first amplifier for amplifying the output of said first amplifier, a first stroboscopic lamp connected to be fired by the output of said first amplifier, and a second stroboscopic lamp connected to be fired by the output of said second amplifier.

10. In a balancing machine for balancing through the use of a stroboscopic light, a pick-up for producing a vibration signal, a first tuned amplifier for amplifying said signal, a second tuned amplifier for amplifying the output of said first amplifier, a stroboscopic lamp, and a firing circuit connected to said lamp and receiving signals from both said amplifiers so as to fire said lamp when said signals are in synchronism.

11. In a balancing machine for balancing through the use of a stroboscopic light, a pick-up for producing a vibration signal, a first tuned amplifier for amplifying said signal, a second tuned amplifier tuned to the same frequency as said first amplifier for amplifying the output of said first amplifier, a stroboscopic lamp, and a firing circuit connected to said lamp and actuated by the two signals from said amplifiers so as to fire said lamp when said signals are in synchronism.

12. In a balancing machine for balancing through the use of a stroboscopic light, a pick-up for producing a vibration signal, a first tuned amplifier for amplifying said signal, a second tuned amplifier tuned to the same frequency as said first amplifier for amplifying the output of said first amplifier, a stroboscopic lamp, and an electronic switch actuated by the outputs of said amplifiers and connected to fire said lamp when the outputs of said amplifiers are in synchronism.

13. In a balancing machine for balancing through the use of a stroboscopic light, a pick-up for producing a vibration signal, a first tuned amplifier for amplifying said signal, a second tuned amplifier tuned to the same frequency as said first amplifier and connected to amplify its output, a signal clipper means connected to the output of each amplifier, a stroboscopic lamp, and an electronic switch actuated by the outputs of said clippers and connected to fire said lamp when the outputs of said clippers are in synchronism.

14. In a machine for balancing a rotary engine, a pick-up mounted to produce a vibration signal from said engine, an amplifier tuned to the frequency of rotation of said engine and amplifying said signal, means on said engine for producing a second signal at the frequency of rotation of said engine, said second signal having a maximum amplitude which always occurs when the rotor of said engine is in one position, means actuated by said signals and producing a third signal which is a function of the difference in phase between said first and second signals, meter means actuated by said third signal, and holding means connected between said means producing said third signal and said meter means, said holding means maintaining on said meter means a steady state D.C. voltage which is a function of said third signal, said holding means holding said voltage on said meter means after said third signal has disappeared.

15. In a machine for balancing a rotary engine, pick-up means associated with said engine for producing a vibration signal from said engine and a reference signal having a maximum amplitude which occurs when the rotor of said engine is in a known position, means for indicating the phase separation between said signals, and means energized by one of said signals to produce a pair of signals having a predetermined phase relationship when said rotor is rotating at the speed at which it is desired to balance said engine, said last named means being associated with said indicating means so that said indicating means is energized as a function of the difference in phase between said vibration and reference signals only when said pair of signals have said predetermined phase relationship.

16. In a machine for balancing a rotary engine, pick-up means associated with said engine for producing a vibration signal from said engine and a reference signal having a maximum amplitude which occurs when the rotor of said engine is in a known position, means for indicating the phase separation between said signals, and frequency sensitive means energized by one of said signals and controlling the energization of said indicating means so that said indicating means is energized as a function of the difference in phase between said vibration and reference signals only when the signal energizing said frequency sensitive means is of a predetermined frequency.

17. In a machine for balancing a rotary engine, pick-up means associated with said engine for producing a vibration signal from said engine and a reference signal having a maximum amplitude which occurs when the rotor of said engine is in a known position, means for indicating the phase separation between said signals, and means energized by said vibration signal to produce a pair of signals which are in phase when said rotor is rotating at the speed at which it is desired to balance said engine, said last named means being associated with said indicating means so that said indicating means is energized as a function of the difference in phase between said vibration and reference signals only when said pair of signals are in phase.

18. In a machine for balancing a rotary engine, pick-up means associated with said engine for producing a vibration signal therefrom, stroboscopic light means for indicating the position of an unbalance mass on the rotor of said engine, and means energized by said vibration signal for producing a pair of signals having a predetermined phase relationship when the rotor of said engine is rotating at the speed at which it is desired to balance said engine, a firing circuit for said stroboscopic light means, said last named means being connected to said firing circuit to fire said stroboscopic light means only when said pair of signals have said predetermined phase relationship.

19. In a machine for balancing a rotary engine, pick-up means associated with said engine for producing a vibration signal therefrom, stroboscopic light means for indicating the position of an unbalance mass on the rotor of said engine, and means energized by said vibration signal for producing a pair of signals which are in phase when the rotor of said engine is rotating at the speed at which it is desired to balance said engine, a firing circuit for said stroboscopic light means, said pair of signals being fed to said firing circuit to fire said stroboscopic light means only when said pair of signals are in phase.

20. A machine as set out in claim 19 wherein said means for producing said pair of signals comprises a first tuned amplifier connected to said pick-up to produce a first of said pair of signals, and a second tuned amplifier energized by said first signal to produce the second of said pair of signals, said stroboscopic light means being fired only when said first and second signals are in phase.

References Cited in the file of this patent

UNITED STATES PATENTS

| | | |
|---|---|---|
| 1,611,716 | Brown | Dec. 21, 1926 |
| 2,133,687 | Drake | Oct. 18, 1938 |
| 2,300,198 | Brown | Oct. 27, 1942 |
| 2,448,323 | De Boisblanc | Aug. 31, 1948 |
| 2,616,288 | Mesa | Nov. 4, 1952 |
| 2,636,381 | Hagg et al. | Apr. 28, 1953 |
| 2,651,937 | Martin | Sept. 15, 1953 |
| 2,731,835 | Hellar et al. | Jan. 24, 1956 |
| 2,741,756 | Stocker | Apr. 10, 1956 |
| 2,783,648 | Stovall et al. | Mar. 5, 1957 |

FOREIGN PATENTS

| | | |
|---|---|---|
| 632,652 | Great Britain | Nov. 28, 1949 |
| 726,107 | Great Britain | Mar. 16, 1955 |